United States Patent

[11] 3,580,187

| [72] | Inventor | Lawrence P. Marks<br>Brown Deer, Wis. |
|---|---|---|
| [21] | Appl. No. | 742,045 |
| [22] | Filed | July 2, 1968 |
| [45] | Patented | May 25, 1971 |
| [73] | Assignee | A. O. Smith Corporation<br>Milwaukee, Wis. |

[54] LOAD TIEDOWN TENSIONER
8 Claims, 6 Drawing Figs.

[52] U.S. Cl. ................................... 105/369,
105/367, 248/361
[51] Int. Cl. .................................... B61d, 45/00
B60p 7/08
[50] Field of Search ........................................... 105/369
(A), 368 (T), 367; 248/119, 361, 361 (A);
280/179.1; 267/154, 155, 156; 254/154, 155

[56] References Cited
UNITED STATES PATENTS

| 2,873,694 | 2/1959 | Jaskowiak | 105/369(A) |
| 2,901,240 | 8/1959 | Fikse | 105/197(TX) |
| 3,022,536 | 2/1962 | Floehr | 105/377(X) |
| 3,090,586 | 5/1963 | Schwegler et al. | 267/154 |
| 3,161,150 | 12/1964 | Sable | 105/366 |
| 3,339,909 | 9/1967 | Hanslip et al. | 267/154 |
| 3,377,882 | 4/1968 | Schrempp | 267/154 |

Primary Examiner—Drayton E. Hoffman
Attorney—Andrus, Sceales, Starke & Sawall

ABSTRACT: The present disclosure relates to tiedown means. A stack of vehicle frames are mounted on a bed. A box beam is disposed over the frames or integrated into the bed. A pair of parallel torsion shafts having a high spring rate are mounted in the box beam. The first shaft is fixed at one end to the beam end wall and protrudes from the opposite wall. A crank is secured to the free end of the first bar and disposed between a pair of stop elements on the end wall. The shaft is prestressed to engage the one stop with a selected stored energy with the holding rotation of the arm increasing the stress. The second shaft is similarly constructed, but oppositely disposed to dispose the crank to the opposite end of the assembly.

Suitable straps or chains are interconnected to the cranks to clamp the load to the bed. A one-way locking means selectively limits the movement of the crank to prevent pivoting and increasing the shaft stress after the initial setting.

Inventor
Lawrence P. Marks
By Andrus, Sceales, Starke & Sawall
Attorneys

Inventor
Lawrence P. Marks
By
Andrus, Sceales, Starke & Sawall
Attorneys

LOAD TIEDOWN TENSIONER

This invention relates to a load tie apparatus and particularly to a tiedown tensioning apparatus for releasably securing a load to a movable bed of a vehicle, such as a railroad car, a truck or other movable and storage support.

In the handling and transporting of various products, releasable anchor means are normally provided to interconnect the load to the carrier in a fashion which assures form support of the load for extended periods of time and particularly during movement or transit of the load and support. The anchor means often include a resilient means to cushion the load against shock forces and maintain a firm anchoring to the load to the support. Although many satisfactory tiedown devices have been suggested, the cushion means of compressible nature have often been found to establish a permanent set with a resulting loosening of the tiedown or anchor means, unless special provision is provided to take up the slack occasioned by the set of the cushion means. Such a load, for example, has been encountered in the movement of automobile frames and the like. Generally, the frames are stacked on the bed of a railroad car, truck or the like with an encircling tiedown or anchor means looped over the load and secured to the bed to firmly anchor the load to the bed during movement and storage thereof. Wooden spacers are generally interposed between the individual frames and frame components as a protective measure. However, the wooden spacers tend to compress under the force of the tiedown means and actually exhibit a permanent set condition with a consequent loosening or loss of tension in the tiedown means. This results in a corresponding reduced effectiveness in the support of the load.

The present invention is particularly directed to a variable-type tension tiedown or anchoring means which includes a resilient member which is not subject to permanent set and which is constructed to maintain an essentially near-constant holding or tying force on the load, even though there may be appreciable compression of the load. Thus, the tension device of the present invention provides an essentially flat force versus deflection characteristic to maintain an even anchoring force on the load. In a particularly novel construction, a pair of parallel torsion bars are interconnected with a connecting device to define an encircling load anchor means. The first bar is fixed at one end of the beam and protrudes from the opposite or second end. Crank means is secured to the free end of the first bar and disposed between suitable stop means to provide limited angular rotation or movement. The bar is prestressed to an initial fixed position engaging the first stop means with a selected stored energy. Additional rotation of the arm and the torsion bar increases the load capacity. The angular displacement is selected to cover a practical range of possible movement and particularly in accordance with the desired linear displacement of the load occasioned by the compression and set deformation conditions encountered. The second torsion bar is similarly constructed, but oppositely disposed to dispose the crank means to the opposite end of the assembly. Each of the torsion bars is selected to have a relatively high spring rate to maintain the essentially flat force versus deflection characteristics.

The torsion bars can be conveniently mounted within a suitable boxlike beam and disposed over the load with suitable strapping means interconnected between the crank means and the bed. Alternatively, they can be interconnected to a boxlike beam or other support forming an integral part of the support means with a strapping means encircling the top and sides of the load and interconnected to the crank means to provide the necessary anchoring force onto the load.

The present invention has been found to provide a reliable tiedown apparatus for securing a load, and particularly a plurality of stacked frames onto a storage and transfer bed.

The drawing furnished herewith illustrates a preferred construction of the present invention presently contemplated by the inventor in which the above advantages and features are clearly disclosed, as well as others which will be readily understood from the following description of the drawing.

Figure 1:
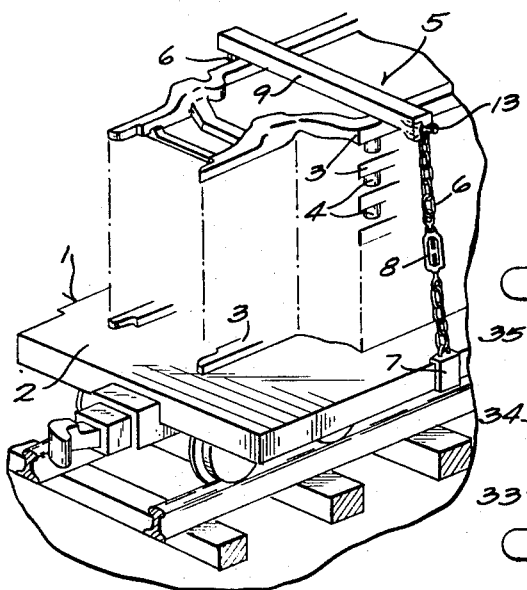
FIG. 1 is a fragmentary pictorial view showing the invention applies to anchoring stacked automobile frames to the flatbed of a railroad car.

Referring to the drawing, and particularly to FIG. 1, a fragmentary portion of a railway car 1 having a flatbed 2 is illustrated with stacked automobile frames 3 supported thereon. The frames 3 may be used for automobile trucks or other vehicles. Generally, wood spacer members 4 are interposed between the frames 3 to vertically space them from each other and thereby prevent damage during movement or transit. The stacked frames 3 are secured to the bed 2 by a load tie means constructed in accordance with the present invention and generally including a tension unit 5 spanning the topmost frames 3 and interconnected at the opposite ends by similar chain units 6 to the aligned opposite sides of bed 2. In the drawing, only the one chain unit 6 appears in full view. The other unit may be identical and no further illustration thereof appears necessary or is given.

In the illustrated embodiment of the invention, each chain unit 6 terminates in connecting hooks at the opposite ends which are connected respectively to the tension unit 5 and to a bed anchor hook 7 secured to the side of the flatbed 2. The chain unit 6 includes a turnbuckle 8 to permit tightening thereof for establishing a selected downward force or pull on the corresponding end of the tension unit 5 and therethrough onto the top of the stacked vehicle frames 3.

The tension unit 5 generally includes a boxlike frame or beam 9 which defines an anchor means for a pair of horizontally spaced torsion bars 10 and 11 which are arranged in a fore-and-aft relationship with respect to the bed 2.

The torsion bars 10 and 11 extend outwardly from the opposite ends of the beam 9 and respectively carry the coupling crank arms 12 and 13 extending in the opposite direction with respect to the load and similarly interconnected to the chain unit 6. Each of the bars 10 and 11 includes substantially the same construction and the fore torsion bar 10 and associated coupling arm 12 is described in detail with the corresponding elements of the aft torsion bar 11 and its associated coupling arm 13 identified by corresponding primed numbers for simplicity and clarity of explanation.

The torsion bar 10 is a shaft-like member formed of a suitable spring steel or other metal which has a very high spring rate and which maintains essentially a flat force versus angular deflection or twisting characteristic over the load forces employed in the particular application, as more fully described hereinafter.

The one end of the shaft 10 includes an hexagonal shaped head 14 telescoped into a corresponding opening in a boss 15 forming a part of the one end of the beam 9. The illustrated beam 9 is generally a boxlike enclosure having an end plate 16 welded or otherwise secured to the one end with the boss 15 integrally formed therein. The shaft or the torsion bar 10, and particularly head 14, protrude slightly from the boss in the position shown and is secured against movement from the boss and inwardly into the boxlike beam 9 by a clamping plate 17 secured to the outer end of the head 14 by a suitable clamping bolt 18. The bar 10 extends through the boxlike beam 9 and is preferably provided with a central bearing support 19 to prevent bending deflection of the beam. The opposite end of the bar 10 extends outwardly of the beam 9 and terminates in an hexagonal coupling head 20, similar to head 14.

The coupling arm 12 is a crank member having an hexagonal opening mating with the coupling head 20. A clamp plate and bolt assembly 21, similar to that of plate 17 and bolt 18, hold the arm on the head 20. The corresponding end of the beam 9 is closed by an end plate 22 having a tubular bearing embossment or support 23 through which the bar 10 is freely movable. A split bearing 24 is secured within the boss 23 by clamping bolts 25 which pass through a flange on the bearing and thread into the inner end face of the boss 23. The bearing 24 rotatably supports the adjacent end of the bar 10.

Figure 3:
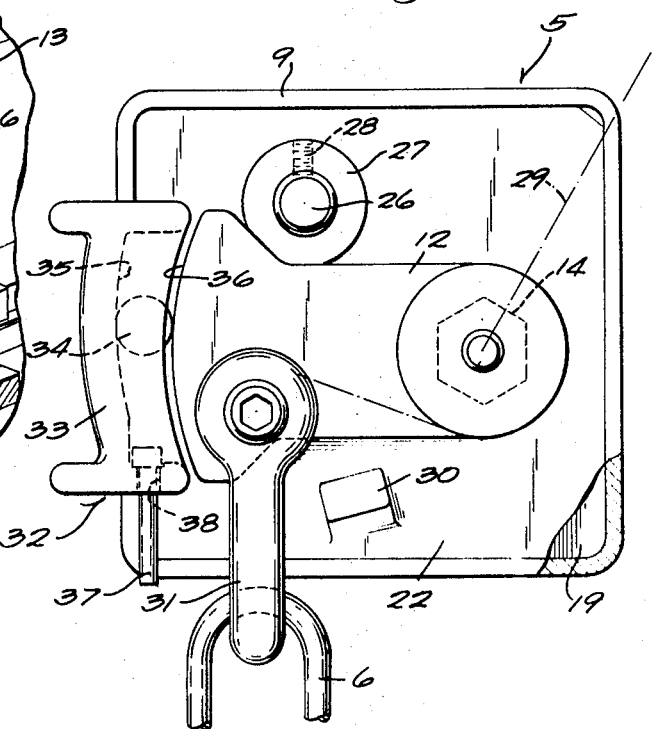
FIG. 3 is an enlarged end elevational view of the tiedown apparatus constructed in accordance with the teaching of the present invention.
Figure 2:
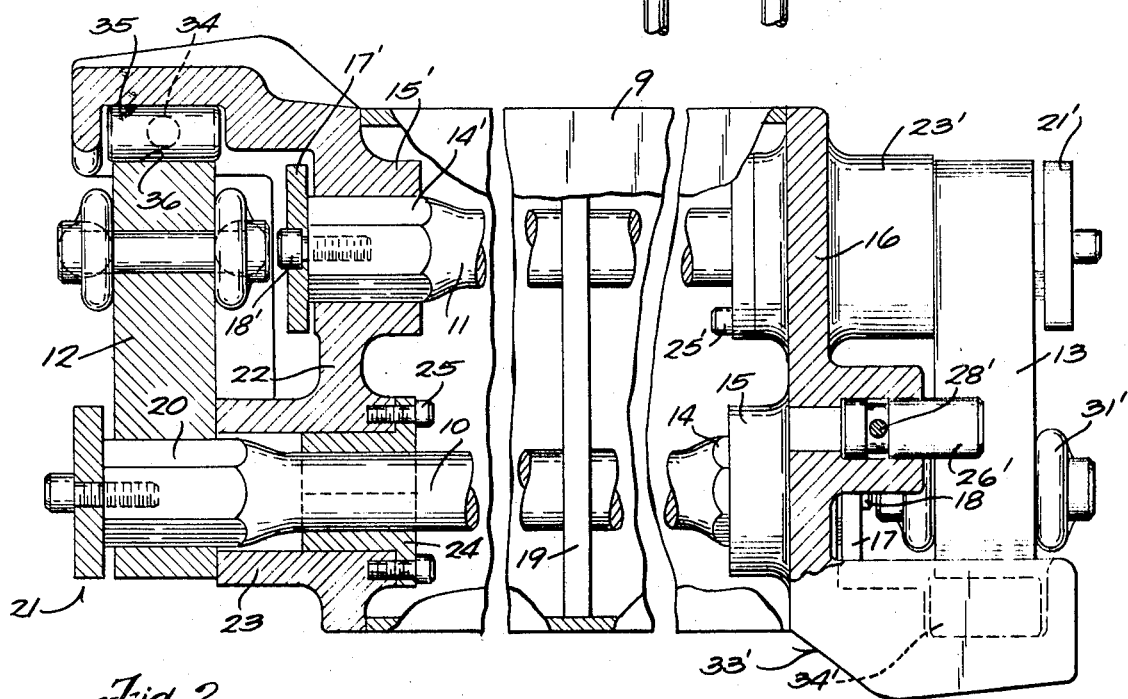
FIG. 2 is a plan view of the tiedown apparatus shown in FIG. 1 with parts broken away and sectioned to show the detail of construction.
Figure 4:
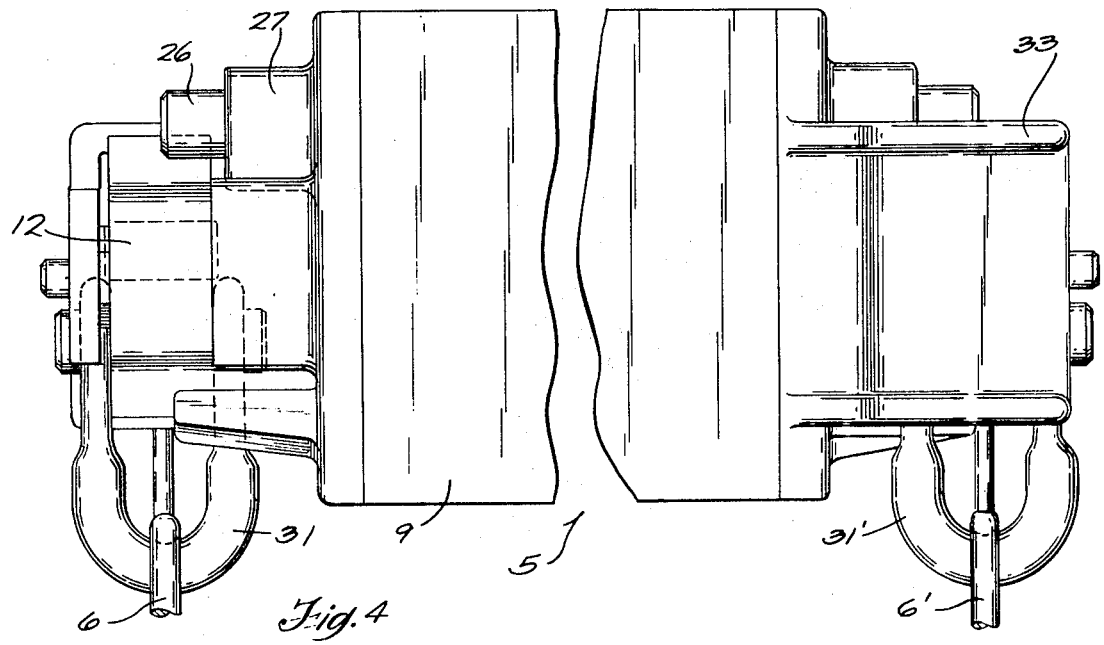
FIG. 4 is an elevational view from the left of FIG. 3.

Referring particularly to FIG. 3, the bar 10 is twisted and correspondingly stressed with the coupling arm 12 engaging a stop means 26, as partially shown in phantom. The illustrated stop means includes a stop pin 26 secured within an embossment 27 in the adjacent end plate 22 and is releasably secured thereto by a setscrew 28. In the assembly of the unit, the torsion bar 10 is secured within the box beam 9 and the crank arm 12 secured in a normal zero stress position projection upwardly; the zero stress centerline being, shown in phantom as at 29, displaced in a clockwise direction from the stop pin 26. The chain unit 6 is connected to arm 12 and tightened to rotate arm 12 and thereby further stress the torsion bar 10 to maintain a relatively constant tiedown force on the frames 3.

To prevent undue stressing of the torsion bar 10, a bottom or limit stop member or bar 30 is integrally formed on the adjacent end plate 22 and projected outwardly beneath the coupling arm 12 to limit its angular movement, as shown. The stop pin 26 may be formed as an integral member similar to bar 30 if desired.

The crank arm 12 projects outwardly as shown with a reduced thickness to minimize material. Shackle 31 is pinned to an outer portion of the arm 12 which is provided with suitable bosses to correspond to the spacing of the sidearms of the shackle. The pinned connection establishes a connection loop for releasable interconnection to the adjacent hook member of the chain unit 6.

A locking unit 32 is secured to end plate 22 adjacent the outer or free end of the crank arm 12 and is releasably coupled to the crank arm 12 to restrict the pivotal movement thereof, as follows. The locking unit 32 includes a cam housing 33 opening toward the crank and within which a roller 34 is disposed. The periphery of the roller 34 engages the base 35 of the cam housing 33 and the adjacent end surface 36 of the crank arm 12. The end of the crank arm 12 is enlarged and formed with circular end surface 36 having the axis of the shaft 10 as the center. The base 35 of the cam housing defines a curved surface having the center offset with respect to that of the shaft 10 such that the spacing between the base 35 and the end circular surface 36 of the crank arm is greater than the roller diameter at the top and gradually decreases to less than such diameter from the top to the bottom. The crank arm 12 is therefore free to pivot clockwise and upwardly, as viewed in FIG. 3 but prevented from downward pivotal movement. A release pin 37 is slidably disposed within an opening 38 in the bottom wall of the housing 33 and is adapted to be forced upwardly to hold the roller 34 in the large portion of the cam housing to permit free pivotal movement of the crank arm 12. The roller 34 is released during the initial tightening of the chain 6. When the load compresses, the crank arm 12 pivots clockwise to maintain a firm hold on the load.

The locking roller 34 prevents return counterclockwise movement of the crank arm 12 under conditions tending to move the load longitudinally and thereby assists in preventing of shifting of the load. Thus, as the railroad car 1 stops or starts suddenly, horizontal forces tend to shift the load longitudinally of bed 2. If the crank arm 12 is free to pivot, the shift forces may be sufficiently large to actually shift the load and pivot the crank arm 12.

The torsion bar 11 is similarly constructed with the fixed connection adjacent the coupling arm 12 and projecting outwardly through a bearing and end plate connection at the opposite end of beam 9. Further, the coupling arm 13 extends forwardly or in the opposite direction from that of the arm 12 to provide an opposite torque action or force on the bar 11 and the beam 9.

In the assembly, the frames 3 are stacked to the flatbed 2 with wood spacers 4 interposed therebetween. The tension unit 5 is placed on top of the load with the beam 9 extending slightly outwardly to the opposite sides thereof. The chain units 6 are secured to the shackles 31 and to the bed hooks 7. The locking rollers 34 are released and the turnbuckles 8 are drawn up to exert a downward pull on the crank-coupling arms. By sufficient tightening of the turnbuckles 8, the coupling arms 12 and 13 are angularly displaced from the normal position downwardly to increase the tension force in the bars 10 and 11, thereby exerting a firm anchor of the frames 3 to the flatbed 2 of car 1. Further, the opposite tension forces exerted by the bars 10 and 11 are reflected in the beam 9 and thus tend to maintain the beam 9 in a flat and firm engagement with the frames 3. As the wood spacers 4 compress and set, the tension is slightly released on the coupling arms 12 and 13, but will be maintained within the load capacity established by the stop pin 6 and the plate or bar 30. As the torsion bars are selected of a suitable steel with a high spring rate, and thus have a relatively flat force-versus-deflection characteristic, an essentially constant load force is maintained.

In an actual frame tiedown unit, the torsion bar 10 and the crank arm 12 are arranged to rotate through 90° between the position engaging the stop pin and the zero stress position and in so doing, create a load of 9,000 pounds on the bar and crank arm. Rotation of the arm in a counterclockwise direction through 30°, increased the load to 12,000 pounds and was associated with essentially 2 inches of travel for the outer coupling end of the arm. This was found to provide a practical design for firmly and securely attaching a load of vehicle frames 3 in place.

Figure 5:
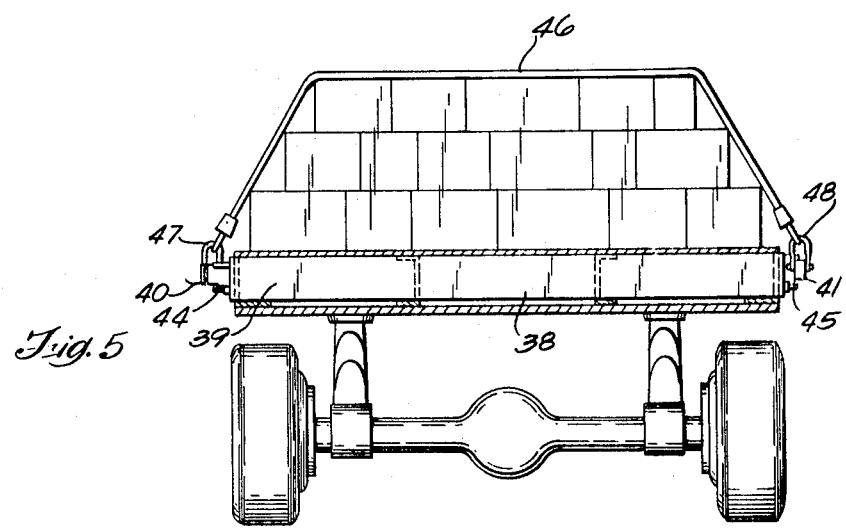
FIG. 5 is a view showing the element of FIG. 2 and forming a part of the truck bed or other suitable load support means.
Figure 6:
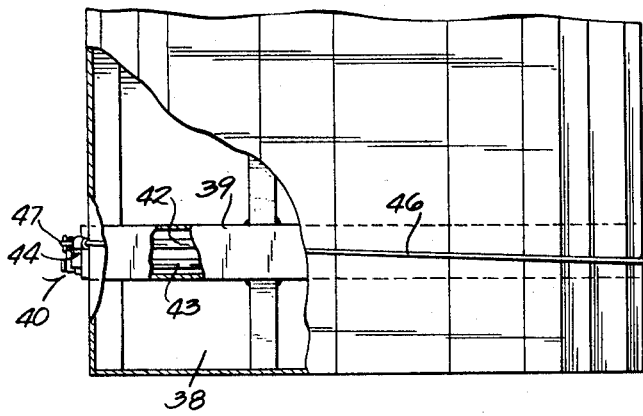
FIG. 6 is an enlarged fragmentary view of FIG. 5.

Although illustrated as a separate tension unit 5 adapted to overlie the load, the unit 5 may also be disposed below the load with an over encircling loop connector or the like and furthermore may be made to be an integral part of the support construction. For example, in FIGS. 5 and 6, a tension unit 5 is shown as an integral part of a flatbed forming the supporting bed or platform 38 of a truck or other suitable vehicle. In FIGS. 5 and 6, a crossbeam 39, generally similar to the boxlike beam of FIGS. 1 through 4, is integrated into the platform 38 with the coupling arms 40 and 41 disposed immediately adjacent to the opposite sides of the platform 38. The arms 40 and 41 are connected to torsion bars 42 and 43 as in the previous embodiment. In this case, the torsion bars 42 and 43 are stressed in an opposite direction, that is, tending to rotate downwardly into engagement with the stop pins 44 and 45. In FIG. 5, a rope 46 is looped over the load, shown as a plurality of suitable stacked timbers, and interconnected to the arms 40 and 41 by shackles 47 and 48 and coupling hooks. When the load is attached, the rope 46 is drawn up and the arms 40 and 41 are pivoted upwardly to increase the stress in the torsion bars 42 and 43 and produce the desired tension holddown of the load. The locking structure of the previous embodiment has not been shown in FIGS. 5 and 6 but may, of course, be employed therein. Otherwise, the illustrated embodiment of the invention shown in FIG. 5 and 6 will function in essentially the same manner as that illustrated in FIGS. 1—3.

The present invention has been found to provide a firm and reliable anchoring means for holding, for extended periods of time, a load of a compressible nature.

Various modes of carrying out the invention are contemplated as being within the scope of the following claims particularly pointing out and distinctly claiming the subject matter which is regarded as the invention.

I claim:

1. A load tie apparatus for securing a compressible load to a support member, an elongated anchor means including a beamlike enclosure adapted to span said load, a first torsion bar fixed at one end to said anchor means and extending through said enclosure and extending from the end of the beamlike enclosure to span said load and terminating in a rotatable free end, a first coupling crank means secured to said free end of the torsion bar, said first crank means being angularly movable from a first preselected stressed position a second torsion bar fixed to the anchor means adjacent the first crank means and extending through said enclosure parallel to the first torsion bar and extending from the opposite end of the beamlike enclosure and terminating in a rotatable free end, a second coupling crank means connected to the free end of said second torsion bar, said second crank means being angularly movable from a first preselected stressed position, and means interconnecting said crank means and rotating said crank means in opposite directions to correspondingly oppositely torque said torsion bars and establish a spring force on the anchor means and the load to secure the load to the support member and establish a stablilizing effect on the load tie apparatus.

2. The load tie apparatus of claim 1, having stop means connected to the anchor means and in the path of said crank means to establish said first preselected stressed position and a second preselected stressed position to limit the stress on said torsion bars.

3. The tie apparatus of claim 1, wherein said anchor means is an integrated part of the support member.

4. A load tie apparatus for securing a compressible load to a support member, an elongated box having a rectangular cross section closed at the opposite ends by end closure walls, said box being adapted to span said load, a first torsion shaft having a head at one end mating with a locking opening in the first end closure wall and extending through said box an rotatably supported in the second end closure wall, a first coupling crank means connected to the outer end of the shaft for angularly moving said shaft, a first stop means on said second end closure wall limiting the angular movement of the crank to a first preselected stressed position a second stop means on said second end closure wall limiting the angular movement of the crank to a second preselected stressed position, a second torsion shaft fixed to the second end closure wall adjacent the first crank means and extending parallel to the first torsion shaft and rotatably supported in the first end closure wall, a second coupling crank means secured to the outer end of the second torsion shaft, and a pair of stop means on said first end closure wall limiting said second crank means movement between a first preselected stressed d position and a second preselected stressed position, said crank means extending in diametrically opposite direction in the plane of said torsion shafts.

5. A load tie apparatus for securing a compressible load to a support member, comprising support means adapted to span said load and interconnected to the support member and having a releasable means exerting a force on the exterior of the load toward said support member to establish an essentially constant holding force on said load with compression of the load, said releasable means including a beam member adapted to span said load, a torsion bar means having an essentially flat force-versus-deflection characteristic disposed within said beam with crank members secured to the opposite ends of said bar means, a one-way locking means coupled to the crank members, said locking means allowing free movement of the crank members and bar means toward an unstressed position and preventing movement to a stressed position, and means to selectively release said locking means.

6. A load tie apparatus for securing a compressible load to a support member, comprising support means adapted to span said load and interconnected to the support member and having a releasable means exerting a force on the exterior of the load toward said support member to establish an essentially constant holding force on said load with compression of the load, said releasable means including an elongated anchor means adapted to span said load, a first torsion spring shaft fixed at one end to said anchor means and extending to span said load and terminate in a first coupling crank means at the opposite side of the load, said first crank means being angularly movable from a preselected stressed position, a second torsion spring shaft fixed to the anchor means adjacent the first crank means and extending parallel to the first torsion spring shaft with a second coupling crank means at the opposite end, said second crank means being angularly movable from a first preselected stressed position, a locking means for each of said crank means and each including a housing having a cam surface spaced from the free end of the crank means, said free end defining a second cam surface spaced from the first cam surface by a progressively changing amount, and a locking member disposed between said cam surfaces thereby preventing the pivoting of the crank means and the associated stress to said anchor means.

7. The load tie apparatus of claim 6 wherein said housing is connected to said anchor means and opens toward said crank means, the outer end of the crank means defining a circular surface having the axis of the associated shaft as a center, said housing having a base wall defining an opposed curved surface with a center offset to establish a greater spacing from the circular surface at the end aligned with the unstressed position of the crank means, a roller disposed within said space and having a diameter less than said maximum spacing and greater than said minimum spacing, and a release rod in said housing and coupled to said roller for holding the roller in said area of maximum spacing for initial securement of said crank means.

8. A load tie apparatus securing a compressible load to a support member, comprising an elongated beamlike housing spanning the load, a pair of parallel torsion bars secured within said housing to span the load and essentially enclosed by the housing to protect the bars from the surrounding environment, means securing one end of the first torsion bar to the housing and securing the opposite end of the second torsion bar to the housing, a first connection means between the second end of the first torsion bar and the support member and twisting said first torsion bar about its axis to torque up the torsion bar at the connection means to thereby define a spring loading of the interconnection between the housing and the support member, a second connection means between the support member and the second end of the second torsion bar and twisting the second torsion bar about its acid in a direction opposite from that of the first torsion bar to torque up the second torsion bar and establish a spring connection of the torsion bar to the support member, said torsion bars defining an essentially flat force-versus-deflection characteristic and thereby establishing an essentially constant holding force on said load with compression of the load.

UNITED STATES PATENT OFFICE
CERTIFICATE OF CORRECTION

Patent No. 3,580,187            Dated May 25, 1971

Inventor(s) Lawrence P. Marks

It is certified that error appears in the above-identified patent and that said Letters Patent are hereby corrected as shown below:

| | |
|---|---|
| Column 1, line 7, | Cancel "form" and substitute therefor ---firm--- |
| Column 5, line 1, | After "position" insert a comma (,) |
| Column 5, line 32, | After "position" and before "a" insert a comma (,) |
| Column 5, line 42, | After "stressed" cancel "d" |
| Column 6, line 52 | Cancel "acid" and substitute therefor ---axis--- |

Signed and sealed this 21st day of December 1971.

(SEAL)
Attest:

EDWARD M. FLETCHER, JR.      ROBERT GOTTSCHALK
Attesting Officer                Acting Commissioner of Patents